United States Patent
Espindola et al.

[11] Patent Number: 6,141,142
[45] Date of Patent: Oct. 31, 2000

[54] ARTICLE COMPRISING AN L-BAND OPTICAL FIBER AMPLIFIER

[75] Inventors: Rolando Patricio Espindola, Chatham; Thomas Andrew Strasser, Warren; Paul Stephen Westbrook, Chatham; Paul Francis Wysocki, Flemington, all of N.J.

[73] Assignee: Lucent Technologies Inc., Murray Hill, N.J.

[21] Appl. No.: 09/252,560

[22] Filed: Feb. 19, 1999

[51] Int. Cl.[7] .................................................. H01S 3/00
[52] U.S. Cl. ................................. 359/341; 359/124
[58] Field of Search .................... 359/341, 124; 372/6

[56] References Cited

U.S. PATENT DOCUMENTS

| | | | |
|---|---|---|---|
| 5,117,303 | 5/1992 | Desurvire et al. | 359/341 |
| 5,406,411 | 4/1995 | Button et al. | 359/341 |
| 5,430,572 | 7/1995 | DiGiovanni et al. | 359/341 |
| 5,701,194 | 12/1997 | Meli et al. | 359/341 |
| 5,740,292 | 4/1998 | Strasser | 385/37 |
| 6,049,418 | 4/2000 | Srivastava et al | 359/341 |

FOREIGN PATENT DOCUMENTS

| | | | |
|---|---|---|---|
| 0650234A1 | 9/1994 | European Pat. Off. | H01S 3/06 |
| 11145539 | 5/1999 | Japan . | |
| 11145937 | 5/1999 | Japan . | |
| 0897205 | 1/1998 | United Kingdom | H01S 3/06 |

OTHER PUBLICATIONS

Chung et al, Demonstration of 540dB Loss Compensation over 52NM Gain Bandwidth with Wideband Erbium–Oopel Fiber Amplifier IEEE, pp 644–645, 1999.
Min et al, Performance Improvement of Wideband EDFA by ASE injection from C band to L band Amplifier, IEEE 1346–1347, 1999.
Lee et al, Enhancement of Power Conversion Efficiency for an L Band EDFA with secondary pumping effect in the unpumped EDF section, IEEE, 42–43, 1999.
Kakui et al., *OFC '96 Technical Digest* "Improved Erbium–Doped Fiber Amplifiers Employing Chirped Fiber Gratings as ASE Rejection Filters for WDM Transmission", vol. 2, pp. 118–119, Feb./Mar. 1996.
Zyskind et al., *OFC '94 Technical Digest* "Two–Stage EDFAs With Counterpumped First Stage Suitable for Long–Haul Soliton Systems", vol. 4, pp. 131–132, Feb. 1994.
Erdogan et al., *J. Opt. Soc. Am.* "Tilted Fiber Phase Gratings" vol. 13, No. 2, pp. 296–313, Feb. 1996.
Sun et al., *Electronics Letters*, "80nm Ultra–Wideband Erbium–Doped Silica Fibre Amplifier", vol. 33, No. 23, pp. 1965–1967, Nov. 6, 1997.
Massicott et al., *Electronics Letters*, "Low Noise Operation of $Er^{3+}$ Doped Silica Fibre Amplifier Around 1•6$\mu$m", vol. 28, No. 20, pp. 1924–1925, Sep. 24, 1992.
Yamada et al., *Electronics Letters*, "Broadband and Gain–Flattened Amplifier Composed of a 1.55$\mu$Band $Er^{3+}$–Doped Fibre Amplifier in a Parallel Configuration", vol. 33, No. 8, pp. 710–711, Apr. 10, 1997.
Ono et al., *IEEE Photonics Technology Letters*, "Gain–Flattened $Er^{30}$ –Doped Fiber Amplifier for a WDM Signal in the 1.57–1.60–$\mu$m Wavelength Region", vol. 9, No. 5, pp. 596–598, May 1997.

(List continued on next page.)

*Primary Examiner*—Mark Hellner
*Attorney, Agent, or Firm*—Eugene E. Pacher

[57] ABSTRACT

L-band EDFA (Er-doped fiber amplifier) characteristics are improved by provision of filter means in the C-band, the filter means having a figure of merit greater than 400dB·nm. The filter means can be discrete and/or distributed filter means. In preferred embodiments, two or more full C-band blazed fiber Bragg, gratings are used.

10 Claims, 6 Drawing Sheets

OTHER PUBLICATIONS

Fukushima et al., *OFC '97*, "Flat Gain Erbium–doped Fiber Amplifier in 1570nm—1600nm Region for Dense WDM Transmission Systems", pp. PD3–1–PD3–4.

Sun et al., *IEEE/Laser and Electro–Optics Society*, "Ultra Wide Band Erbium–Doped Silica Fiber Amplifier With 80 nm of Bandwidth", pp. PD2–1–PD2–5, Jul., 1997.

Vengsarkar et al., *OFC '95, Long–Period Fiber Gratings as Band–Rejection Filters*, pp. PD4–1–PD4–5, Feb/Mar 1995.

Sun et al. *ECOC '98*, A Gain–flattened Ultra Wide Band EDFA For High Capacity WDM Optical Communications Systems, vol. 1, pp. 53–54, Sep. 1998.

Sun et al., *ECOC, European Conference of Integrated Optics and Optical Fibre Communication*, "An 80 nm Ultra Wide Band EDFA with Low Noise Figure and High Output Power", vol. 5, pp. 69–72, Sep. 1997.

Yamada et al., *IEEE Photonics Technology Letters*, "Gain–Flattened Tellurite–Based EDFA with a Flat Amplification Bandwidth of 76 nm", vol. 10 No. 9, pp. 1244–1246, Sep. 1, 1998.

Wysocki et al., *IEEE Photonics Technology Letters*, "Broad–Band Erbium–Doped Fiber Amplifier Flattened Beyond 40 nm Using Long–Period Grating Filter", vol. 9, No. 10, pp. 1343–1345, Oct. 1997.

Suzuki et al., *Electronics Letters*, "Bidirectional 10–Channel 2.5 Gbit/s WDM Transmission Over 250 km using 76nm (1531–1607 nm) Gain–Band Bidirectional Erbium–Doped Fibre Amplifier", vol. 33, No. 23, pp. 1967–1968, Nov. 6, 1997.

ARTICLE COMPRISING AN L-BAND OPTICAL FIBER AMPLIFIER

FIELD OF THE INVENTION

This invention pertains to articles (e.g., an optical fiber communication system, or a component for use in such a system) that comprise an L-Band optical fiber amplifier.

BACKGROUND OF THE INVENTION

Er-doped fiber amplifiers (EDFAs) are widely used in optical fiber communication systems. Traditionally, EDFAs are used in the wavelength range from about 1525 nm to about 1565 nm, a range that is commonly referred to as the C-band (when "C" stands for "conventional").

A significant fraction of installed optical fiber (e.g., dispersion-shifted fiber) is not suitable for multichannel dense wavelength division multiplexed (DWDM) operation across the entire C-band wavelength range because of non-linear effects such as four-wave mixing. Thus, it would be advantageous to have available an optical fiber amplifier that can operate in a wavelength regime that includes the operating wavelength of the above referred to installed optical fiber, typically greater than 1565 nm.

Recently use of EDFAs in the approximate range 1565–1625 nm has been reported. See, for instance, J. F. Massicott et al., *Electronics Letters*, Vol. 28, pp. 1924–1925 (1992). This range is now commonly called the L-band, where "L" stands for "long". Operation in both the C-band and the L-band in a single EDFA has also been reported. See Y. Sun et al., *Proceedings of the European Conference on Optical Communication* (ECOC '98), pp. 53–54 (1998).

To date, the reported performance of L-band EDFAs has been inferior to that routinely available in C-band EDFAs. For instance, the noise figure (NF) of L-band EDFAs has generally been 1–2 dB higher than for C-band EDFAs, and the output power of the former has typically been 1 to several dBs lower than that of the latter. In view of the potential advantages of a L-band EDFA, it would be highly desirable to have available a L-band EDFA with improved performance, desirably comparable to that of C-band EDFAs. This application discloses such an EDFA.

FIG. 1 shows the base modeling parameters for a conventional Er-doped fiber (EDF), with numerals 10 and 11 referring to absorption and gain, respectively. The C-band and L-band are also indicated. The fiber has a numerical aperture (NA) of 0.23, a cut-off wavelength of 850 nm, an Er concentration estimated at $9.0 \times 10^{25}$ ions/m$^3$ in the core, 12M % Al in the core, and adequate Ge to provide the NA of 0.23. The absorption curve of FIG. 1 was measured with all erbium ions in the ground state, and the gain curve was measured in the presence of a high (>300 mW) 980 nm pump power level, which is expected to place all the Er-ions in the excited state (full inversion).

FIG. 2 shows the possible net gain spectra achieved by the fiber of FIG. 1. These are all linear combinations of the gain and loss spectra of FIG. 1, determined according to the formula $$G(\lambda)/L = g^*(\lambda)\bar{\mathrm{Inv}} - \alpha(\lambda)[1-\bar{\mathrm{Inv}}],$$

where g* and α are the gain and loss parameters of FIG. 1, and $\bar{\mathrm{Inv}}$ is the average inversion of the ions along the length of the fiber.

It is known that, in order to achieve a low noise figure (NF) in an EDFA, substantially all ions must be in the excited state. This produces the 100% inversion gain of FIG. 2. In practice, achieving this high inversion gain shape over a substantial portion of the input end of an EDFA (exemplarily enough to produce more than about 10 dB of gain) is adequate to provide a low NF.

It will be noticed that the gain shape of the 100% inversion curve of FIG. 2 is substantially higher in the C-band than in the L-band. Thus, if a highly inverted EDF is long enough to accumulate 10 dB or more of gain across the entire L-band, some wavelengths in the C-band will experience very large gain (exemplarily 50 dB, even 100 dB). In practice, such gain levels are not achieved, for the below-stated reasons. We have analyzed this situation and have found that amplified spontaneous emission (ASE) in the C-band accumulates to a high power level and drives a substantial fraction of the Er ions into the ground state, thereby reducing the gain and increasing the NF. Furthermore, power accumulated and emitted as ASE in the C-band is lost and is not available for emission as signal power in the L-band, thereby decreasing amplifiers efficiency.

Based on our analysis, we have concluded that C-band ASE is typically the largest source of degradation in an L-band amplifier.

EDFAs that operate in at least a portion of the L-band are know, as are EDFAs with an ASE filter. For instance, M. Yamada et al., *Electronics Letters*, Vol. 33(8), p. 710 (1997) disclose a broad band and gain-flattened amplifier that comprises a 1.55 μm band EDFA and a 1.58 μm band EDFA in parallel configuration. H. Ono et al., *IEEE Photonics Technology Letters*, Vol. 9(5), p. 596 (1997) disclose a gain-flattened EDFA for use in the 1.57–1.60 μm wavelength region. See also Y. Sun et al., *Electronics Letters*, Vol. 33, p. 1965 (1997). European patent application No. 94115479.1 inter alia discloses a 2-stage fiber amplifier with an ASE filter between the stages. M. Kakui et al., *OFC '96 Technical Digest*, WF3, disclose an EDFA that employs a chirped fiber grating as ASE rejection filter for WDM transmission. J. L. Zyskind et al., *OFC '94 Technical Digest*, WK8, disclose a 2-stage EDFA with counter-pumped first stage that comprises an ASE filter. U.S. Pat. No. 5,406,411 discloses a multistage fiber amplifier including an ASE filter.

U.S. Pat. No. 5,430,572 inter alia discloses ASE filtering for the peak around 1530 nm to help the gain near 1550 nm in the C-band. Such filters are low magnitude narrow band devices. U.S. Pat. No. 5,701,194 discloses differential attenuation of ASE relative to a signal in a "contiguous band". It also shows low magnitude ASE filtering near 1530 nm to help C-band gain near 1550 nm.

SUMMARY OF THE INVENTION

As discussed above, our analysis of L-band EDFAs has led to the conclusion that C-band ASE is the largest source of degradation in an L-band amplifier.

The ASE accumulation problem could be reduced by operating the EDFA in a lower inversion condition, e.g., corresponding to the 50% inversion curve of FIG. 2. However, this solution would require use of a much longer EDF to produce the desired gain, since the gain is reduced in both C-band and L-band. This solution would also lead to significantly increased NF. Clearly, operation of the EDFA at relatively low inversion has drawbacks that make this approach undesirable.

We have discovered that placement of appropriate filter means into the EDFA can result in substantial improvement in amplifier characteristics.

Specifically, the invention is embodied in an article that comprises an EDFA that is adapted for amplification of optical signals in the wavelength region 1565–1625 nm, the amplifier comprising a length L of Er-doped optical fiber.

Significantly, the EDFA further comprises optical filter means, disposed in said length L of Er-doped optical fiber, with said optical filter means selected to provide the amplifier with a figure of merit greater than 400 dB·nm, where said figure of merit ("FOM") is the integral of FL (λ) over the wavelength region from 1520 nm to 1565 nm, where FL (λ) is the total loss at wavelength λ due to said filter means over said length L.

In currently preferred embodiments the optical filter means comprise one or more broad (typically covering substantially all of the C-band) and deep (loss typically greater than 10 dB) filter(s) in the EDF. To the best of our knowledge, such an EDFA is not disclosed or suggested by the prior art.

Whereas improved amplifier characteristics can be obtained with a single broad and deep filter (e.g., about 40 nm and 10 dB), even better results can frequently be obtained with two or more filters selected to yield a FOM>400 dB·nm and disposed at different positions along the EDF.

Although optical filter means that comprise one or more discrete filters are currently preferred, the invention is not thus limited. For instance, distributed filter means are possible, and are contemplated. Such distributed filter means are selected to provide wavelength dependent absorption in the 1520–1565 nm wavelength region. Discrete filter elements exemplarily are selected from the group of filter elements consisting of blazed Bragg gratings, reflective mode converters, dielectric filters, fused fiber couplers and fused biconic fiber couplers. Such filter elements are known to those skilled in the art. The optical filter means can also be a combination of discrete and distributed filter means.

The drawings are not to scale or in proportion.

DETAILED DESCRIPTION

A significant aspect of the invention is the provision of filter means in the Er-doped fiber, the filter means selected to provide the amplifier with a FOM greater than 400 dB·nm, where the FOM is the integral of FL (λ) over the wavelength region 1520–1565 nm, where FL (λ) is the total loss at λ due to the optical filter means over the length L of Er-doped fiber.

The FOM can also be expressed as follows:

$$FOM = \int_a^b FL_1(\lambda) d\lambda + \int_a^b FL_2(\lambda) d\lambda + \ldots + \int_{z=0}^L \left[ \int_a^b \alpha_d(\lambda, Z) d\lambda \right] dZ$$

The above expression allows for the existence of n discrete filtering devices with losses $FL_1(\lambda)$, $FL_2(\lambda)$, ... $FL_n(\lambda)$, expressed in dB, the devices located at position $z_1, z_2, \ldots z_n$ within the length L of EDF. It also allows the presence of a distributed unsaturable loss $\alpha_d(\lambda,z)$, expressed in dB/m. In the expression, integration is over the spectral region from a=1520 nm to b=1565 nm, and over the EDFA length, i.e., z=0 to L.

The above expression is the sum of all C-band losses in an L-band EDFA, whether due to discrete or distributed filter means.

Figure 3:
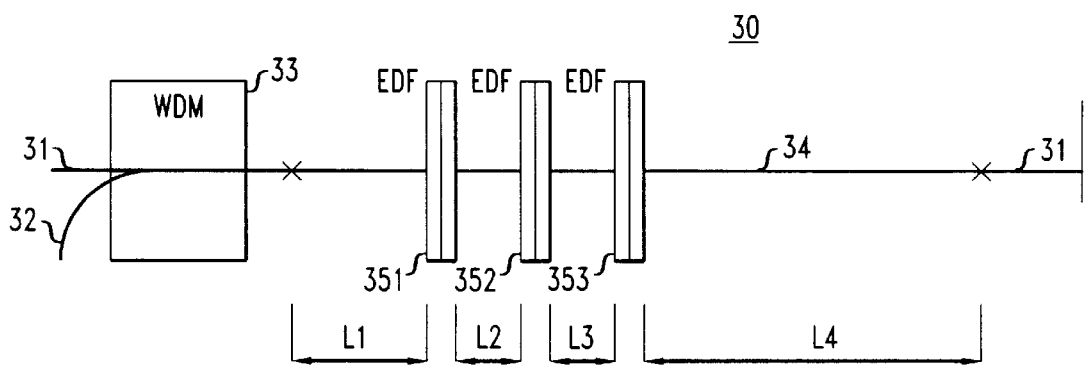
FIG. 3 schematically depicts an exemplary L-band EDFA according to the invention.

FIG. 3 schematically depicts an exemplary embodiment of the invention, namely, a L-band EDFA 30 with a multiplicity of spaced apart C-band rejection filters with large FOM. L-band signals are propagating from the transmitter (not shown) to the receiver (not shown) on conventional transmission fiber 31, and pump radiation is propagating from the pump source (not shown) through fiber 32 to WDM 33. The combined signal and pump radiation are then coupled into EDF 34 and, after passage through the length L of EDF, the amplified L-band signals typically are coupled into conventional downstream transmission fiber 31.

Disposed in the EDF are several (e.g., 3) C-band rejection filters 351, 352 and 353. Upstream filter 351 is placed a predetermined distance $L_1$ from the input end of the EDF, filter 352 is spaced a predetermined distance $L_2$ from filter 351, and filter 353 is spaced a predetermined distances $L_3$ from filter 352. The total length of EDF in the exemplary single state EDFA is L.

In preferred embodiments the filters are formed in the EDF in known manner. However, this is not a requirement, and a grating could be formed in a length of Er-free fiber, and the fiber with the grating therein can be spliced to appropriate lengths of EDF.

Figure 4:
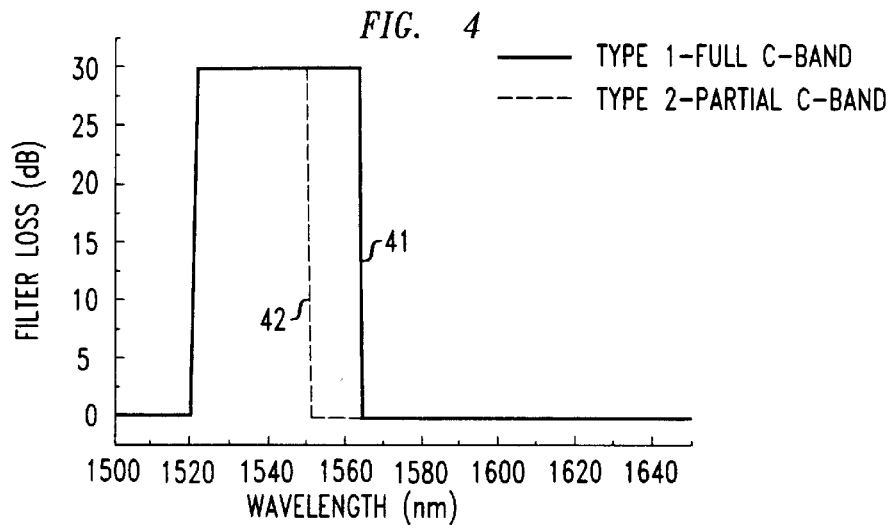
FIG. 4 schematically shows the filter loss of a full C-band filter and of a partial C-band filter.

FIG. 4 schematically shows the filter loss of two C-band filters. Both filters have 30 dB filter loss. Curve 41 is for a substantially full C-band filter (covering the range 1520–1563 nm), and curve 42 is for a partial C-band filter (exemplary covering the range 1520–1550 nm). The former has FOM=1290 dB·nm, and the latter has FOM=900 dB·nm.

Figure 1:
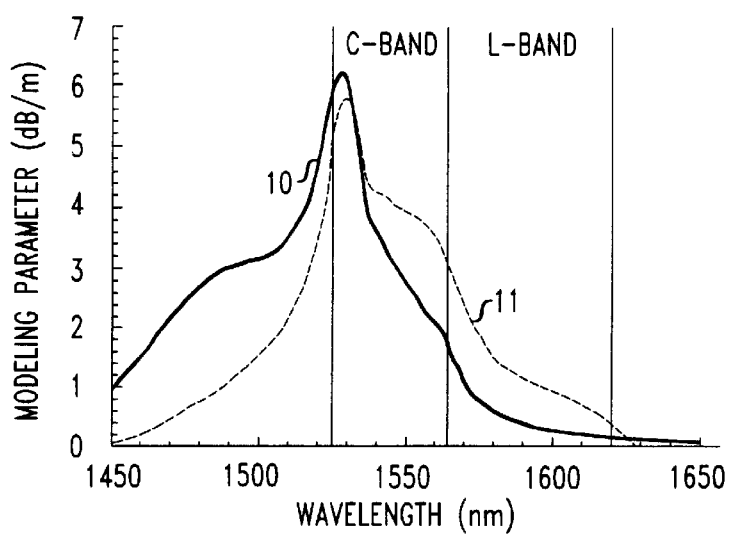
FIG. 1 shows the modeling parameters of a commercially available EDF as a function of wavelength.
Figure 2:
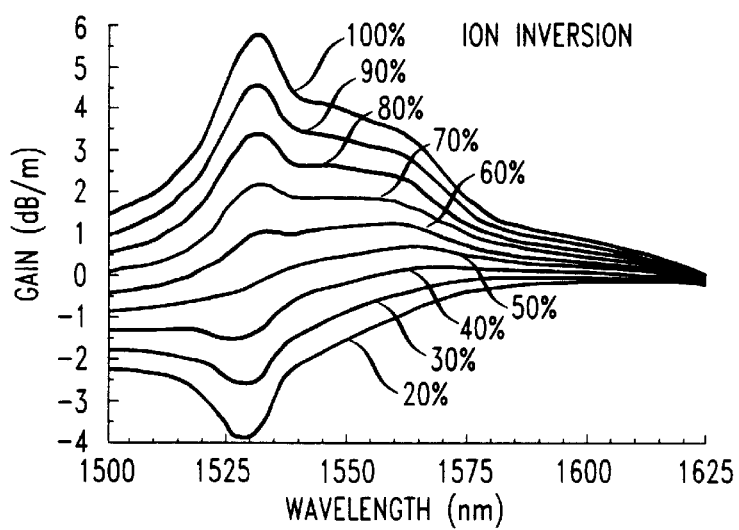
FIG. 2 shows gain as a function of wavelength, for various levels of ion inversion.

The data of FIG. 1, together with the filter characteristics of FIG. 4, were used in a conventional numerical simulation (using the OASIX simulation tool, which is commercially available from Lucent Technologies' Specialty Fiber Division) of the characteristics of an EDFA as shown in FIG. 3, for total signal power of −10 dBm, $L_1=L_2=L_3=6$ m, and L as shown. The pump light was assumed to be 100 mW at 980 nm, copropagating with the signal. It will be understood that the above parameters are exemplary only. However, the results of the simulation are representative of amplifier characteristics obtainable in actual L-band EDFAs. For instance, the modeling parameters of FIG. 1 closely correspond to the gain and absorption characteristics of an EDF that is commercially available from Lucent Technologies, Inc. The filter spacing of 6 m was chosen because this was found to be the maximum length for the fiber of FIG. 1 before ASE in the C-band reached levels in the fiber that hurt L-band performance. Clearly, filter spacing could be less than 6 m, but could also be more than 6 m for a different EDF.

Figure 5:
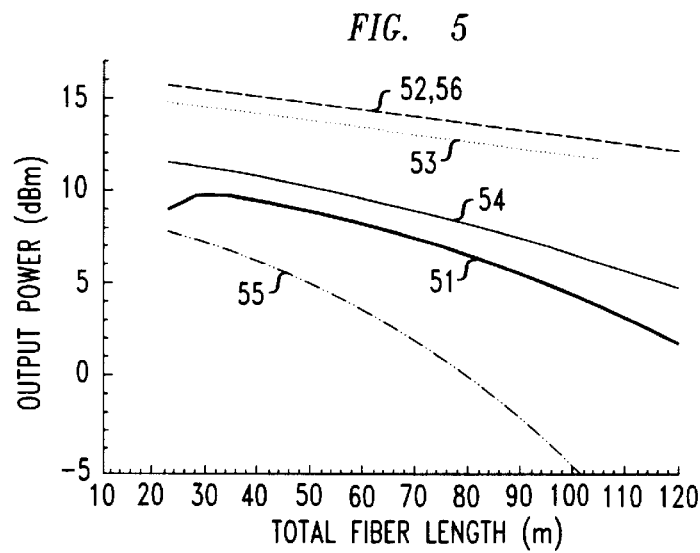
FIGS. 5–12 show simulation results for EDFAs according to the invention, and for an EDFA without C-band rejection filter.

FIG. 5 shows output power as a function of EDF length, as determined by the above referred to numerical simulation. Curve 51 assumes no filters and curves 52–56 assume, respectively, 3 filters (each 30 dB) at 6, 12 and 18 m; 1 filter (30 dB) at 6 m; 1 filter (30 dB at 12 m; 1 filter (30 dB) at 18 m; and 2 filters (each 30 dB) at 6 m and 12 m. All filters are full C-band filters, as shown as curve 41 in FIG. 4. Curves 52 and 56 are essentially indistinguishable.

The simulation clearly shows that even a single, properly placed, full C-band filter yields significantly improved output power, and also shows that further significant improvement is obtained if more than 1 filter is used.

Figure 6:
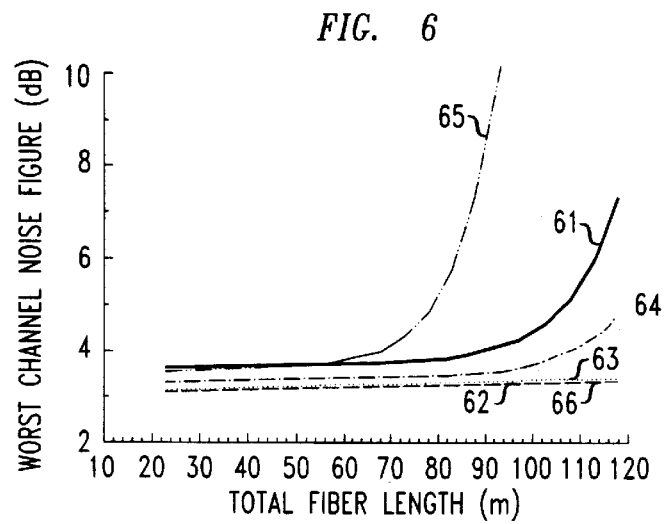

FIG. 6 shows the worst channel NF of the above described L-band EDFA. Curves 61–66 correspond, respectively, to no C-band filter; 3 full C-band filters at 6, 12 and 18 m; 1 full C-band filter at 6 m; 1 full C-band filter at 12 m; 1 full C-band filter at 18 m; and 2 full C-band filters at 6 and 12 m. All filters are 30 dB filters. FIG. 6 shows that the presence of a single, appropriately placed, full C-band filter (with large FOM) can result in improved NF, but that further improvement can be obtained if more than 1 filter is used.

Figure 7:
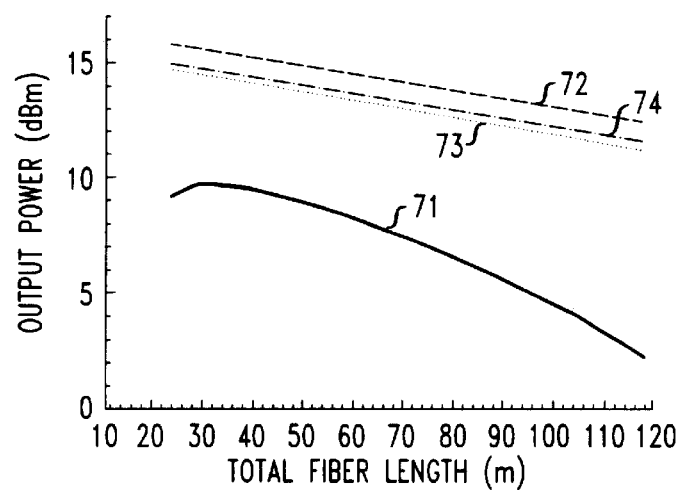

FIG. 7 shows output power vs. EDF length, for no C-band filter (curve 71); 3 full C-band 30 dB filters at 6 m; 12 m and 18 m; (curve 72) 1 full C-band 30 dB filter at 6 m; and 1 full C-band 90 dB filter at 6 m (curve 74). The results of FIG. 7 show that, for best results, the C-band loss advantageously is distributed along the EDF, in two or more spaced apart filters.

Figure 8:
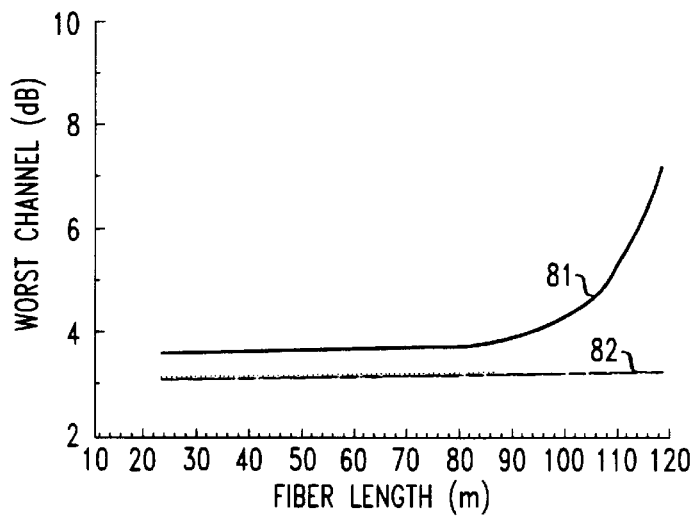

FIG. 8 shows worst channel NF vs. EDF length, for an L-band EDFA as described above. Curve 81 pertains to the case of no C-band filter, and curve 82 pertains to 3 full (30 dB) C-band filters at 6, 12 and 18 m; 1 full (30 dB) C-band filter at 6 m; and 1 full (90 dB) C-band filter at 6 m. The curves show that even a single full C-band filter of high FOM can result in improved NF.

Figure 9:
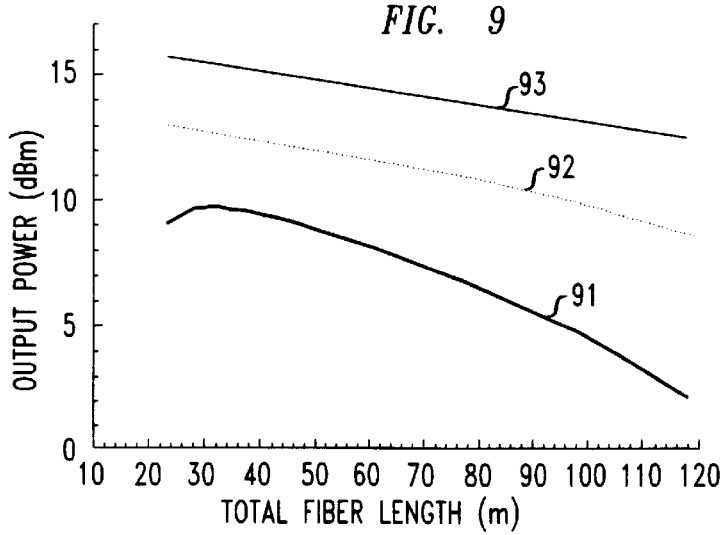
Figure 10:
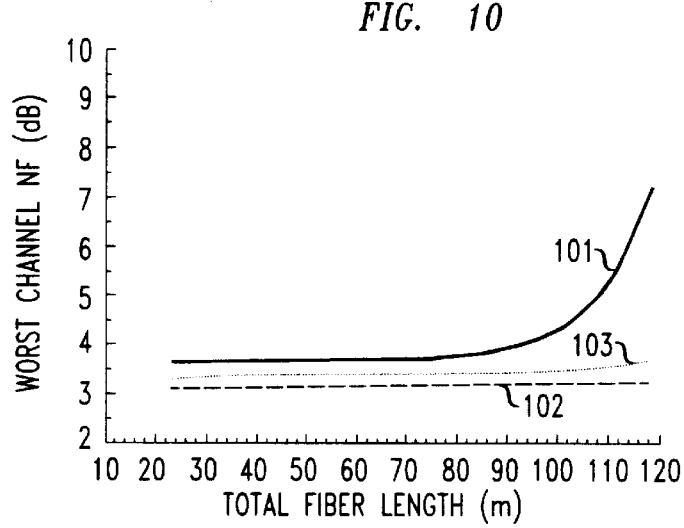

FIGS. 9 and 10 illustrate the effects of filter width. Curves 91 and 101 pertain to an EDFA without C-band filters; curves 92 and 102 pertain to the EDFA with 3 (30 dB) full C-band (1520–1563 nm) filters at 6, 12, and 18 m, and curves 93 and 103 pertain to the EDFA with 3 (30 dB) partial C-band (1520–1550 nm) filters at 6, 12 and 18 m. The curves show that substitution of partial C-band filters for the full C-band filters results in significantly smaller improvement in output power and NF.

Figure 11:
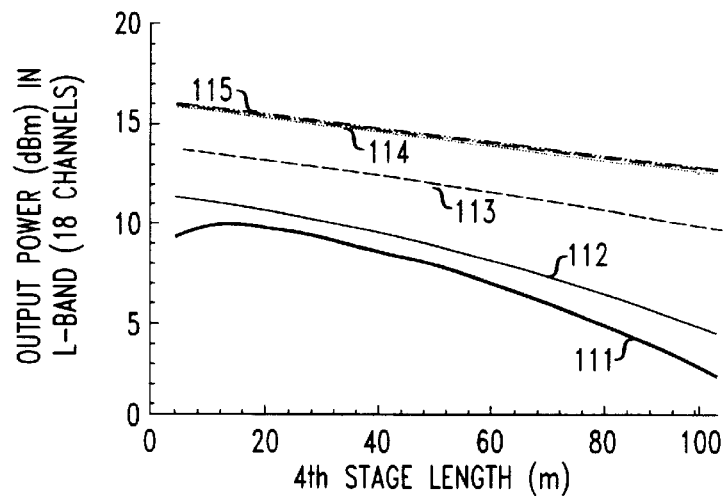

FIG. 11 shows output power in the L-band vs. EDF length, for the above described EDFA, with 3 full C-band filters, located at 6, 12, and 18 m, with varying filter strengths. Curves 111–115 pertain, respectively, to no filters (i.e., 0 dB); 5 dB filters; 10 dB filters; 20 dB filters; 25 dB and 30 dB filters. The curves clearly show improvement in output power with increasing filter strength, up to about 25–30 dB filter strength. Significant improvement (e.g., 50% or more of the maximum possible) is attainable with 2 or 3 full C-band filters, with about 10 dB combined filter loss.

Figure 12:
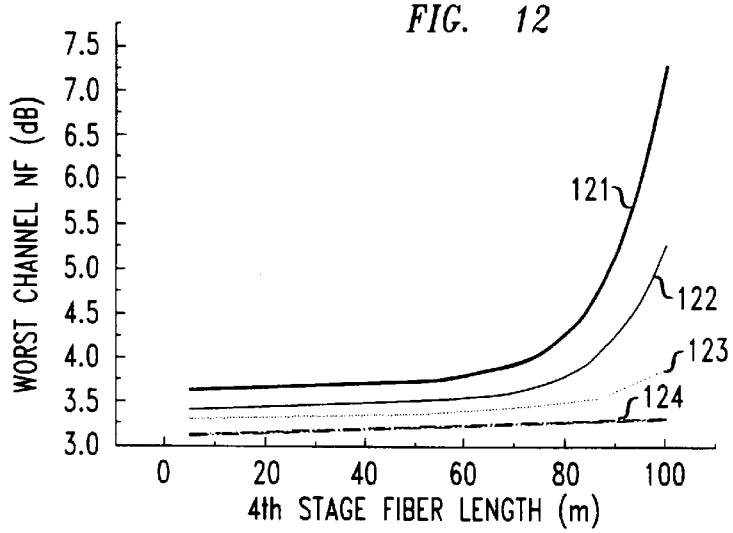

FIG. 12 shows the worst channel NF for the above described EDFA, with curves 121–124 pertaining, respectively to no C-band filter, three 5 dB filters, three 10 dB filters, and three 20 dB, 25 dB or 30 dB filters. The figure also shows that significant improvement is attainable with 2–3 full C-band filters, with about 10 dB combined filter loss.

Some improvement in L-band amplifier performance can be attained if a single C-band filter, of FOM greater than about 400 dB·nm (e.g., filter strength 10 dB or more, and filter bandwidth 40 nm or more) is provided. The filter bandwidth is defined as full width at half maximum (FWHM), as is conventional.

The above disclosed results are exemplary of attainable results, but the invention is not limited to the disclosed embodiments. A variety of C-band rejection filters can result in significantly improved L-band performance and are contemplated. Desirably, the filter has high return loss (e.g., >40 dB), with minimal insertion loss (e.g., <0.1 dB) in the L-band as well as at the pump wavelength (typically 980 nm or 1480 nm). The high return loss can be achieved, for instance, by means of an isolator or circulator. However, these devices typically add undesirable insertion loss.

The above recited simulation results of an exemplary EDFA according to the invention can be compared to simulation results substantially corresponding to a prior art EDFA. Assumed were 100 mW of 980 nm pump light, -10 dBm total signal input into the C-band with 16 channels from 1545–1560 nm (1 nm spacing), with a 20 dB ASE filter (as shown in FIG. 4, except for different strength and width) from 1525 nm to 1540 nm in the C-band. The above described fiber and amplifier configuration were used in the simulation. We found that in this case 5m filter spacing was optimal. The substantial maximum improvement in output power and NF was reached with a single 15 dB filter with bandwidth 1525–1540 nm. The use of two filters produced substantially no improvement. The maximum needed filter FOM is 300 dB·nm (20 dB at 15 nm). This FOM is, to the best of our knowledge, larger than any FOM used in prior practice. C-band ASE filters with FOM=300 dB·nm produced only minor improvement for L-band EDFA.

Filters that have bandwidth of 30 nm or more, with strength that is substantially flat over most of the bandwidth are known. See, for instance, A. Vengsarkar et al., OFC '95, PD4–1; Erdogan et al., J. of the Optical Society of America A, Vol. 13, pp. 296–313 (1996); and U.S. Pat. No. 5,740,292.

Figure 13:
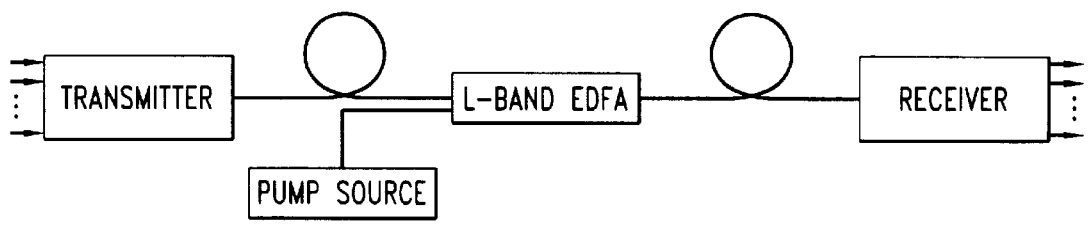
FIG. 13 schematically shows a WDM fiber transmission system with L-band EDFA.

FIG. 13 schematically depicts an article according to the invention, namely, an optical fiber communication system 130 that comprises an L-band EDFA according to the invention. Numerals 131–135 refer, respectively, to a WDM transmitter, conventional transmission fiber, the L-band EDFA, and a receiver. Conventional components (e.g., multiplexer and demultiplexer) are not shown.

Placement of discrete optical filters into the EDF is not the only way the desired improvement in the amplifier characteristics of an L-band EDFA can be attained. For instance, provision of distributed loss means can have similar results. Such a loss means can be an appropriately selected dopant in the EDF, or an appropriately selected waveguide structure. The loss mechanism is active in at least a major portion of the EDF, typically in the entire EDF, and is selected to keep the maximum accumulated gain in the C-band below about 30 dB in any portion of the EDF.

Figure 14:
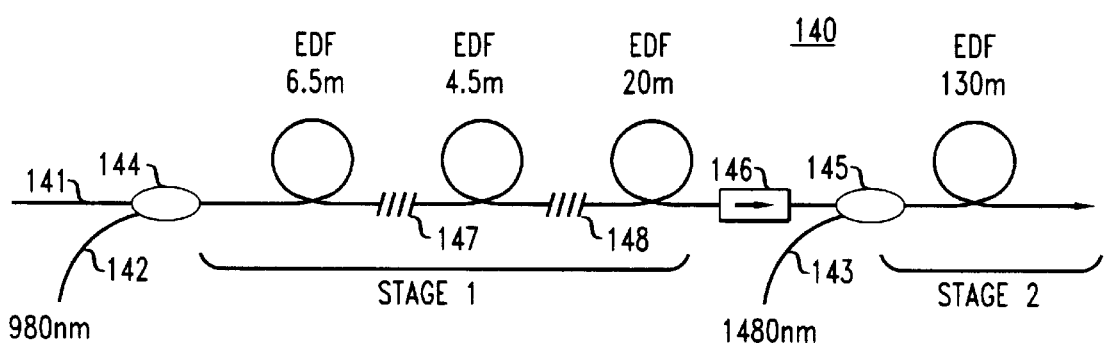
FIG. 14 schematically shows an exemplary L-band EDFA according to the invention.

FIG. 14 schematically shows further exemplary L-band amplifier 140 according to the invention. The amplifier comprised two stages, an input stage (Stage 1) comprising 31 m of Er-doped fiber, and an output stage (Stage 2) comprising 130 m of the same Er-doped fiber. The fiber has a peak absorption of 6 dB/m at 1530 nm. The input stage is divided into three sections of fiber of lengths 6.5 m, 4.5 m and 20 m, respectively, with in-line ASE filters between the sections. The two stages are co-pumped, with 100 mW of 980 nm and 110 mW of 1480 nm pump light, respectively. Pump light is coupled into the amplifier in conventional fashion by means of WDM couplers. A conventional optical isolation is disposed between the amplifier stages to prevent ASE feedback from the second into the first stage. Signal radiation from a conventional transmitter (not shown) propagates in conventional transmission fiber to the L-band amplifier. Pump light (980 nm) is provided by a conventional pump source (not shown) and propagates through conventional fiber 142 to WDM coupler 144 and into the amplifier input stage. The input stage comprises 2 in-line ASE filters 147 and 148. Numerals 146 and 145 refer, respectively, to a conventional optical isolator and a WDM coupler for coupling 1480 nm pump light into the second amplifier stage. The 1480 nm pump light is provided by a conventional pump light source (not shown), and propagates to the WDM coupler through fiber 143. The amplified signal radiation is provided to utilization means (not shown), e.g., transmission fiber that signal transmissively connects the amplifier and a receiver.

Figure 15:
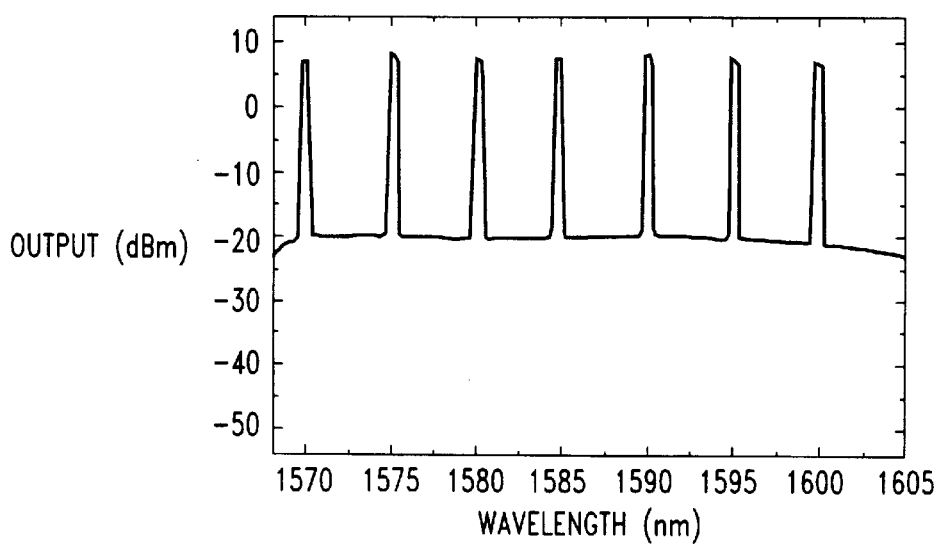
FIG. 15 shows the output spectrum of an EDFA according to the invention.

We measured the performance of the above-described 2-stage L-band optical amplifier. The input saturating signal was composed of seven channels from 1570–1600 nm, spaced 5 nm apart. The power in each channel was set at −20 dBm, so that the total input power to the amplifier was −11.5 dBm. The output power spectrum is shown in FIG. 15. The total output power was 17.1 dBm when the amplifier was pumped with 100 mW of 980 nm and 110 mW of 1480 pump light. The power conversion efficiency (PCE) of the amplifier was 24.3%, corresponding to 31% of the quantum limit.

In an L-band EDFA according to the invention with two or more amplifier stages it is usually the input stage that comprises the C-band filter means. In an EDFA with two or more stages the length L of EDF is understood to be the length of EDF in the stage that comprises the C-band filter means.

Figure 16:
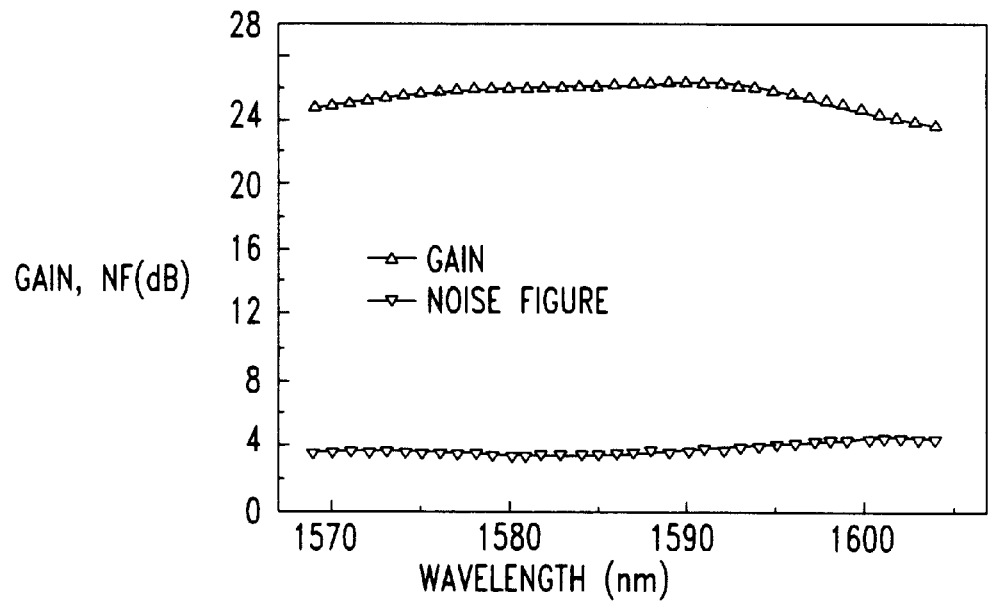
FIG. 16 shows gain and noise figure of an EDFA according to the invention.

FIG. 16 shows the measured gain and noise of the 2-stage above described EDFA. The gain spectrum was obtained by tuning a small probe signal across the band and measuring its gain while the seven saturating signals were turned on. The magnitude of the probe signal was set at −40 dBm (20 dB down from the seven saturating signals) so as not to affect the gain spectrum. The band in which the gain of the amplifier exceeds 27 dB was 33 nm, and the gain variation across the band was about 1.7 dB. A simple gain equalization filter can reduce the gain variation to below 1 dB. The external optical noise figure across the amplifier band was below 4.5 dB. It includes the loss of the WDM coupler and the splice to the erbium fiber. The lowest noise figure was 3.75 dB at 1570 nm, while the highest was 4.45 dB at 1602 nm.

Figure 17:
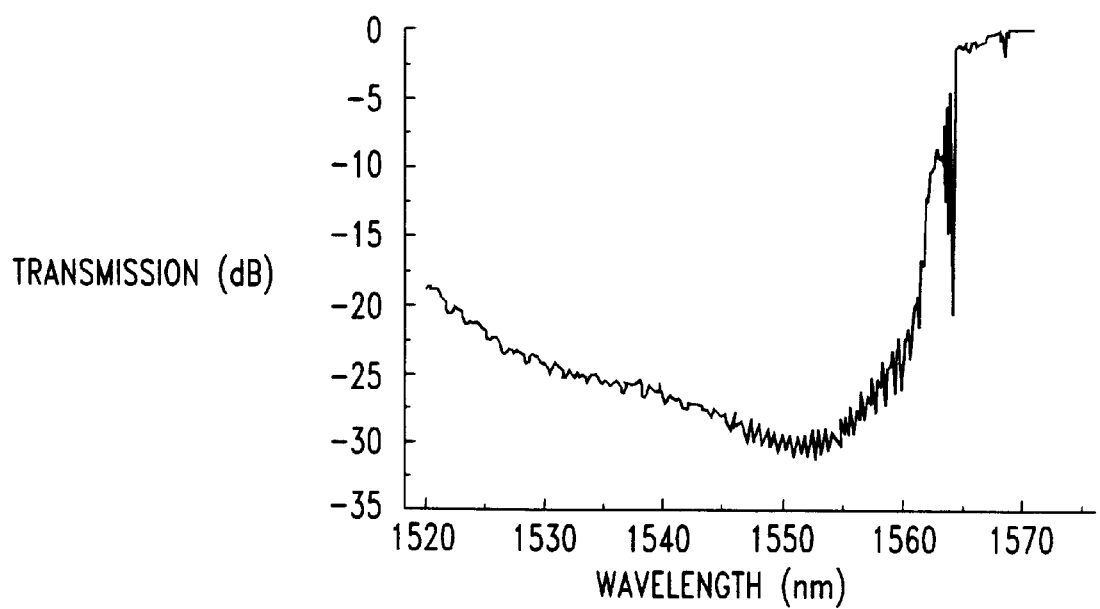
FIG. 17 shows the transmission spectrum of an exemplary blazed fiber Bragg grating.

FIG. 17 shows the transmission spectrum of a blazed fiber Bragg grating that is suitable for use in the above described exemplary amplifier according to the invention. A grating is prepared as follows. Conventional optical fiber (5D fiber available from Lucent Technologies) is loaded with deuterium in conventional fashion and a chirped, blazed Bragg grating is written into the fiber core by UV (242 nm) exposure through a phase mask. The nominal phase mask period is 1.076 nm, and the chirp in phase mask period is 2 nm/cm. The length of grating is 1.5 cm and its profile is approximately Gaussian. The grating blaze is achieved by tilting the phase mask with respect to the fiber. Each filter of the amplifier is comprised of two gratings with phase mask tilt of 3.5 and 6 degrees, giving maximum cladding mode loss near 1560 nm and 1530 nm respectively. The refractive index modulation in each grating is approximately 0.003.

We claim:

1. An article comprising an Er-doped fiber amplifier that is adapted for amplification of optical signal radiation in the approximate wavelength region 1565–1625 nm, the amplifier comprising a length L of Er-doped optical fiber having an input, and also comprising a coupler or couplers for coupling said optical signal radiation and a pump light into said Er-doped optical fiber;

characterized in that the amplifier further comprises optical filter means, disposed in said length L of Er-doped optical fiber, with said optical filter means selected to provide the amplifier with a figure of merit greater than 400 dB·nm, where said figure of merit is the integral of $FL(\lambda)$ over the wavelength region from 1520–1565 nm, where $FL(\lambda)$ is the total loss at wavelength $\lambda$ due to said optical filter means over said length L of Er-doped optical fiber, said figure of merit to be designated "FOM".

2. Article according to claim 1, wherein said optical filter means are selected to provide wavelength dependent absorption in said 1520–1565 nm wavelength region.

3. Article comprising to claim 1, wherein said optical filter means comprise at least one discrete filter element selected to provide filtering in said 1520–1565 nm wavelength region.

4. Article according to claim 3, wherein said at least one discrete filter element is selected from the group of filter elements consisting of blazed Bragg gratings, long period fiber gratings, reflective mode converters, dielectric filters, fused fiber couplers, and fused biconic fiber couplers.

5. Article according to claim 3, wherein said at least one discrete filter element is a blazed Bragg grating.

6. Article according to claim 1, wherein said Er-doped fiber amplifier is a multistage fiber amplifier having an input stage, with said optical filter means disposed in said input stage.

7. Article according to claim 3, wherein said optical filter means further comprise distributed filter means selected to provide wavelength dependent absorption in the 1520–1565 nm wavelength region.

8. Article according to claim 1, wherein said FOM is greater than 500 dB·nm.

9. Article according to claim 3, wherein said optical filter means comprise two or more discrete filter elements.

10. Article according to claim 9, wherein said two or more discrete filter elements are blazed Bragg gratings.

* * * * *